United States Patent [19]
Gregor et al.

[11] Patent Number: 5,099,147
[45] Date of Patent: Mar. 24, 1992

[54] RAMAN CONVERTER WITH VARIABLE WAVELENGTH DISTRIBUTION

[75] Inventors: Eduard Gregor, Pacific Palisades; David W. Mordaunt, Canyon Country; Katherine V. Strahm, Manhattan Beach, all of Calif.

[73] Assignee: Hughes Aircraft Company, Los Angeles, Calif.

[21] Appl. No.: 608,946

[22] Filed: Nov. 5, 1990

[51] Int. Cl.$^5$ ............................................. H03F 7/00
[52] U.S. Cl. ................................................... 359/327
[58] Field of Search ..................... 307/426; 372/3, 106, 372/27, 28, 20

[56] References Cited

U.S. PATENT DOCUMENTS

4,784,450 11/1988 Jain et al. ............................... 307/426
4,821,272 4/1989 Bruesselbach et al. ............. 307/426

Primary Examiner—James W. Davie
Attorney, Agent, or Firm—M. E. Lachman; W. J. Streeter; W. K. Denson-Low

[57] ABSTRACT

A Raman converter comprising an input optical pump beam (16) from a laser (18) that propagates through first and second Raman cells (12,24) and causes Stokes shifted waves (14,26) to be generated therein, and a polarizer (34) disposed between the Raman cells (12,24). The polarizer (34) is switchable during laser operation to cause the Stokes shifted waves (14) from the first Raman cell (12) to be circularly or linearly polarized, thereby causing the Stokes shifted waves (26) in the second Raman cell to be generated as rotationally shifted or vibrationally shifted waves respectively. The polarizer (34) may be switched to the selected circular or linear polarization, or may be repeatedly switched therebetween at regular or pseudo-random intervals. A second polarizer (32) may be disposed upstream of the first Raman cell (12) for selectively switching the polarization of the input pump beam (16) during laser operation. The polarizers (32) and (34) may each be used alone or in combination with each other. Combinations of rotational and vibrational Stokes shifted waves generated in the two Raman cells (12,24) provide multi-wavelength optical output signals with variable wavelength distributions.

26 Claims, 6 Drawing Sheets

RAMAN CONVERTER WITH VARIABLE WAVELENGTH DISTRIBUTION

BACKGROUND OF THE INVENTION

1. Field of the Invention

The present invention relates to an optical converter for generating, in response to an input optical pump beam from a laser, multi-wavelength optical output signals with variable wavelength distribution.

2. Description of the Related Art

Stimulated Raman scattering (SRS) was discovered in 1962, and has been extensively studied in atomic and molecular gasses, numerous liquids, and solids. The generation of tunable coherent radiation by means of stimulated Raman techniques is widely employed as a method for creating intense radiation over a wide range of wavelengths. A basic treatise on stimulated Raman scattering is found in "Tunable Lasers", by J. C. White, Springer Series Topics in Applied Physics, vol. 59, Springer, Berlin, Heidelberg, 1987, pp. 115-207.

It is desirable in certain applications to generate an optical signal which contains a plurality of component waves of different wavelengths, and to be able to vary the distribution of the wavelengths in the signal. Vibrational SRS in a single Raman cell in response to an input optical pump beam from a laser generally generates a single Stokes wave with a relatively large frequency shift. Rotational Raman scattering (SRRS) produces a smaller frequency shift than vibrational SRS, enabling the generation of two, or possibly three Stokes shifted waves. However, increasing the intensity of the input pump beam in an attempt to generate more Stokes shifted waves causes optical breakdown of the Raman medium in the cell at a lower intensity than that at which more waves would be generated.

Where the Raman medium is a gas such as hydrogen, methane, or deuterium, the pressure can be varied to selectively promote the generation of rotationally or vibrationally shifted waves. However, a substantial length of time is required to produce pressure variation, and at higher pressure levels which support vibrational SRS, various other phenomenon, such as stimulated Brillouin scattering (SBS), compete with SRS for pump energy. Thus, the generation of an optical signal with a variable distribution of more than two or three component wavelengths has not been achieved utilizing SRS.

SUMMARY OF THE INVENTION

In accordance with one embodiment of the present invention, a Raman converter is provided in which an input optical pump beam from a laser propagates through first and second Raman cells and causes Stokes shifted waves to be generated therein, and a polarizer, such as a Pockels cell or rotatable quartz waveplate, is disposed between the Raman cells. The polarizer is switchable to cause the Stokes shifted waves from the first Raman cell to be circularly or linearly (or optionally elliptically) polarized, thereby causing the Stokes shifted waves in the second Raman cell to be generated as rotationally shifted or vibrationally shifted waves respectively. The polarizer may be switched to the selected circular or linear polarization, or may be periodically switched therebetween at regular or pseudo-random intervals. In accordance with a preferred embodiment of the present invention, a second polarizer is disposed upstream of the first Raman cell for selectively switching the polarization of the input pump beam. In yet another embodiment of the present invention, the polarizer upstream of the first Raman cell may be used without the polarizer between the two Raman cells. Combinations of rotational and vibrational Stokes shifted waves generated in the two Raman cells provide multi-wavelength optical output signals with variable wavelength distributions.

The present invention overcomes the limitations of prior art single Raman cell converters by providing two or more Raman cells with variable polarization input to each cell. The first cell produces relatively high intensity Stokes shifted waves which act as seeds for the second and subsequent cells, thereby enabling the generation of more, and higher order SRS shifted waves than can be generated in a single Raman cell. Wavelengths may be generated in the dark red and near infrared region of 680-750 nanometers 15 (nm), in addition to the visible region of 532-630 nm to which the prior art using a 532 nm pump is currently limited. Periodic polarization switching enables rotational and vibrational Stokes shifted waves to be generated in selectable combinations, thereby providing a greater diversity of waves than has been possible in the prior art. As a further advantage of the present invention, the polarization states may be periodically switched at a speed which is much higher than that at which the pressure of the medium in the Raman cells can be varied, thereby enabling the generation of an optical wave having a time-varying wavelength distribution.

These and other features and advantages of the present invention will be apparent to those skilled in the art from the following detailed description, taken together with the accompanying drawings, in which like reference numerals refer to like parts.

DESCRIPTION OF THE PREFERRED EMBODIMENTS

Figure 1:
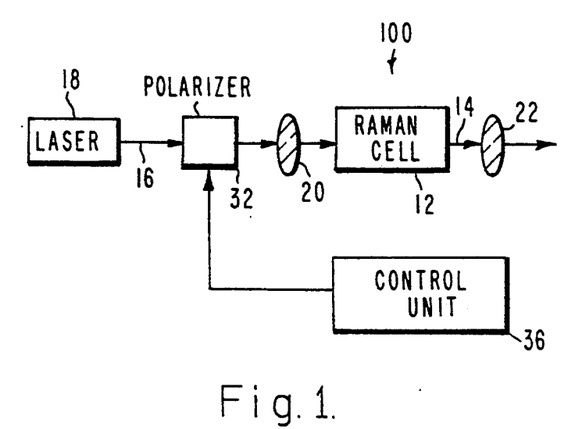
FIG. 1 is a block diagram of a Raman converter in accordance with one embodiment of the present invention incorporating a polarizer upstream of the first Raman cell.

In FIG. 1 a Raman converter with variable wavelength distribution embodying the present invention is generally designated as 100, and includes a Raman cell 12 for generating Stokes shifted waves 14 in response to an input optical pump beam 16 from a laser 18. The pump beam 16 is focused into the Raman cell 12 by a converging lens 20; and the Stokes shifted waves 14 are re-collimated by a converging lens 22 and may be introduced into a second Raman cell (not shown).

In accordance with the present invention, a variable polarizer 32 is disposed upstream of the Raman cell 12, between the laser 18 and lens 20, and is switchable by a control unit 36 between at least two polarization states. Polarizer 32 allows the polarization of the input pump beam to be selectively switched during operation of the converter.

Figure 2:
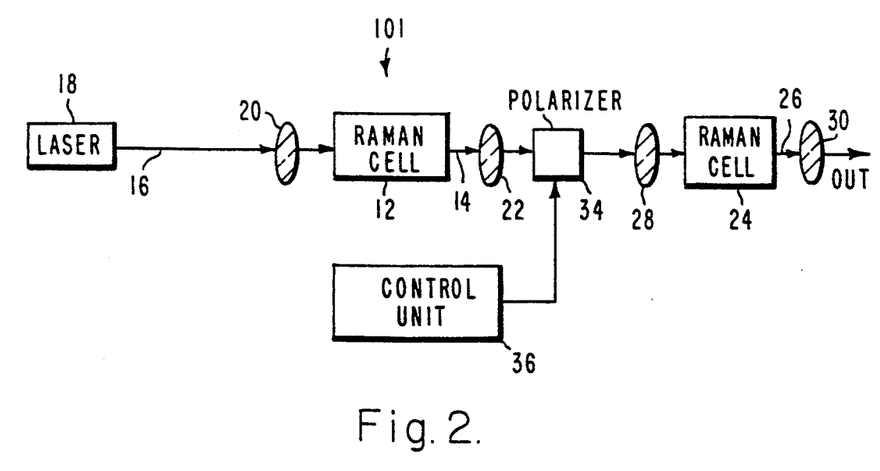
FIG. 2 is a block diagram of a Raman converter in accordance with an alternative embodiment of the present invention incorporating a polarizer between two Raman cells.

FIG. 2 shows an alternative embodiment of the present invention generally designated as 101, and incorporating the laser 18, optical pump beam 16, converging lenses 20 and 22, and Raman cell 12 as in FIG. 1. As shown in FIG. 2, a second Raman cell 24 is disposed downstream of the cell 12 for generating a second set of Stokes shifted waves 26 in response to the first set of Stokes shifted waves 14 from the first Raman cell 12. The waves 14 are re-collimated by converging lens 22, and then are focused into the cell 24 by a converging lens 28. The output waves 26 are re-collimated by a converging lens 30. The waves 14 also constitute a seed for the cell 24, enabling the generation of a second set of higher-order Stokes shifted waves than can be produced by a single Raman cell. A variable polarizer 34 is disposed between the lenses 22 and 28 and is switchable by control unit 36 between at least two polarization states, as described in further detail below. It should be noted that the terms "upstream" and "downstream" are used herein to designate relative position along the wave being generated, before and after, respectively, a reference point.

Figure 3:
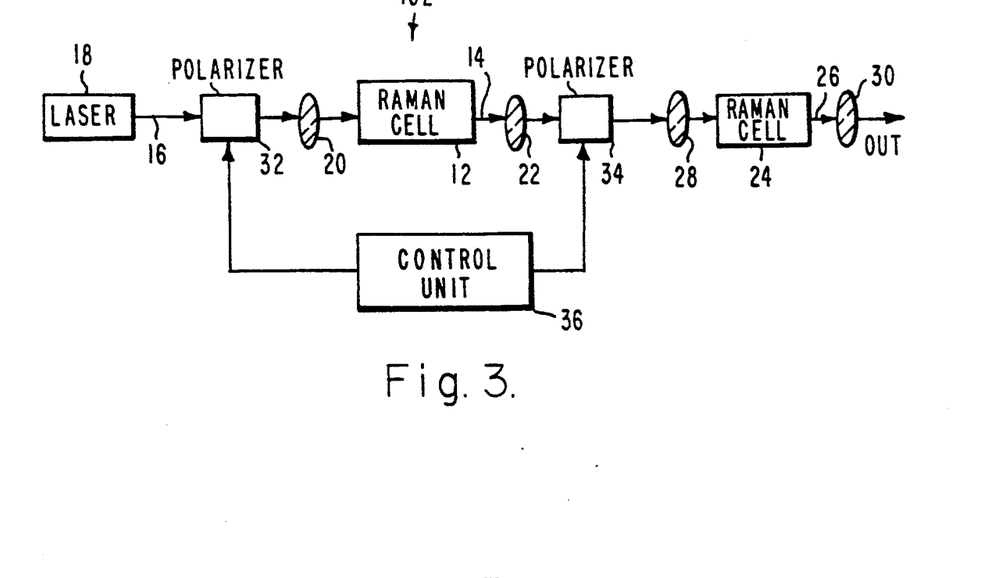
FIG. 3 is a block diagram of a Raman converter in accordance with a preferred embodiment of the present invention incorporating two polarizers and two Raman cells.

FIG. 3 shows a Raman converter in accordance with a preferred embodiment of the present invention, generally designated as 103, in which two polarizers are used. FIG. 3 contains all the elements of FIGS. 1 and 2, including pump beam 16 from laser 18 which passes through a first variable polarizer 32 and is then focused by converging lens 20 into first Raman cell 12. The first set of Stokes shifted waves 14 is re-collimated by converging lens 22 and is introduced into a second variable polarizer 34. The output from the second polarizer 34 is re-collimated by lens 28 and is introduced into a second Raman cell 24. The output 26, which is a second set of Stokes shifted waves from the second Raman cell 24, is re-collimated by converging lens 30. Polarizers 32 and 34 are switchable by control unit 36 between at least two polarization states. Although only two Raman cells are illustrated herein, it is within the scope of the present invention to use more than two Raman cells.

The manner in which the Stokes shifted waves are generated in the cells 12 and 24 varies in accordance with the polarization of the respective input optical beam. Generally, circular polarization will cause generation of rotational Stokes shifted waves, whereas linear polarization will cause generation of vibrational Stokes shifted waves. Elliptical polarization will cause a combination of rotational and vibrational Stokes shifted waves, depending on the degree of ellipticity.

The arrangement shown in FIG. 3 enables generation of the Stokes shifted waves 26, which constitute the optical output signal of the converter 10, with four maximally diversified wavelength distributions and an infinite number of intermediate wavelength distributions. The maximally diversified wavelength distributions result from the following polarization combinations.

(1) Polarizer 32 circular; polarizer 34 circular.
(2) Polarizer 32 circular; polarizer 34 linear.
(3) Polarizer 32 linear; polarizer 34 circular.
(4) Polarizer 32 linear; polarizer 34 linear.

The intermediate distributions result from at least one of the polarizers 32 and 34 causing elliptical polarization of the respective optical signal.

The control unit 36 may be constructed to enable the polarizers 32 and 34 to be merely switched back and forth between, and maintained at, two or more selected polarization states at a predetermined time during a single operation sequence of the laser to provide the input optical signal to the Raman cell. Alternatively, the control unit 36 may be constructed to automatically switch the polarizers 32 and 34 between two or more polarization states during laser operation. The automatic switching may be done at regular intervals, or at pseudo-random intervals under control of a random number generator or the like (not shown) in the control unit 36. The frequency of the polarizer switching is determined by the desired output and final use. When the input optical signal is provided by a pulsed laser, the polarizer may be controlled to switch between successive input pulses so that the output spectrum distribution shifts from pulse to pulse.

Figure 4:
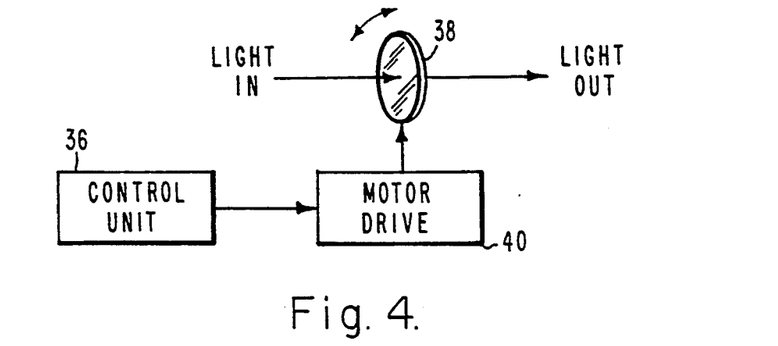
FIG. 4 is a schematic diagram of a variable polarization control system for use in the present invention, employing a mechanically rotatable wave plate.

The polarizers 32 and 34 may be embodied in a number of different forms within the scope of the present invention. As illustrated in FIG. 4, either or both of the polarizers 32 and 34 may include a waveplate 38 which is mechanically rotatable by a motor drive 40 under control of the control unit 36. A treatise on waveplates is found in a textbook entitled "Optics", by E. Hecht et al, Addison-Wesley, Reading, MA 1975, pp. 246-251. The most suitable material for the waveplate 38 is quartz, although the invention is not so limited. Switching between circular and linear polarization is possible, for example, where the wave plate 38 is a quarter wave plate and the respective input beam is oriented at 45° to a principal axis of the plate 38. Rotation of the plate 38 by 45° in opposite directions will generate a phase shift range of 90°, and circular or linear polarization at the respective ends of the range. Rotation to angles other than at the ends of the range will cause elliptical polarization to a degree which varies in accordance with the direction and amount of rotation.

Figure 5:
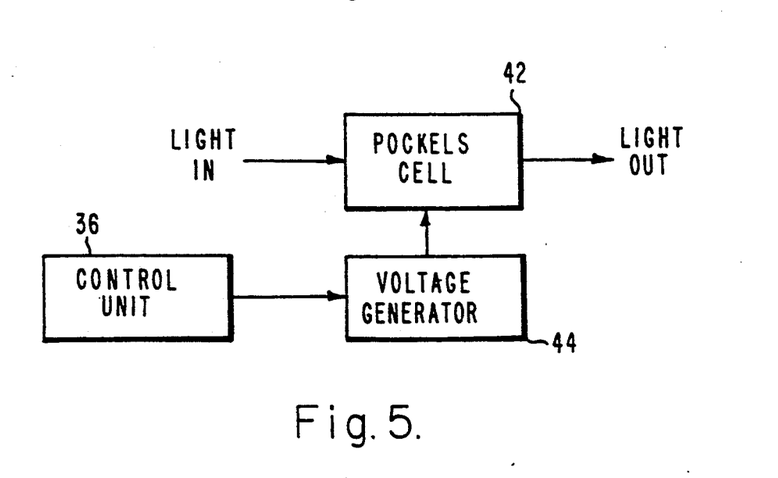
FIG. 5 is a schematic diagram of a variable polarization control system for use in the present invention, employing an electrically variable electro-optic cell.

As illustrated in FIG. 5, either or both of the polarizers 32 and 34 may include an electro-optic cell 42 such as a Pockels cell which is electro-optically variable within a range of birefringent states by means of a voltage generator 44 under control of the control unit 36. A treatise on electro-optic cells is found in a textbook entitled "Solid-State Laser Engineering", by W. Koechner, Springer-Verlag 1976, pp. 411-14 418. The Pockels cell 42 is capable of continuously varying the polarization from circular through elliptical to linear in response to a variable voltage applied to the cell 42.

Other polarizers such as a Fresnel Rhomb described in the previously referenced text by Hecht, may be utilized in practicing the present invention, although not illustrated.

The laser 18 may be a conventional frequency doubled Nd:YAG unit which produces the pump beam 16 at a wavelength of 532 nm. The beam 16 as produced by the laser 18 is coherent. The Raman cells 12 and 24 may be filled with any suitable medium which exhibits the Raman scattering effect, including, but not limited to, hydrogen ($H_2$), deuterium ($D_2$), or methane ($CH_4$) gases. The Raman cells 12 and 24 may be filled with the same or different gases. In addition, one or both of the Raman cells may be filled with a mixture of gases.

The operation of the Raman converter of the present invention will be described with reference to FIGS. 6 to 12, which illustrate experimental results obtained for the embodiment shown in FIG. 3 with $H_2$ in both Raman cells. For FIGS. 6 to 11, a pump wavelength of 532 nm was used. For FIG. 12, a pump wavelength of 266 nm was used. The pressure in cell 12 and 11 pounds per square inch gauge (psig) or 0.77 kilograms per centimeter$^2$ (kg/cm$^2$) and the pressure in cell 24 was 25 psig or 1.76 kg/cm$^2$. The input pump beam 16 had an energy of 200 millijoules (mJ) per pulse, with a 25 nanosecond (ns) pulse width, full width half maximum (FWHM). The laser 18 and lenses 20, 22, 28 and 30 were designed for focussing the respective optical signals in the cells 12 and 24 at a ratio of F/100. The polarizer was a waveplate as previously described and was manually rotated.

$H_2$ produces a rotational Stokes shift of 587 cm$^{-1}$, and a vibrational Stokes shift of 4155 cm$^{-1}$. These shifts result in the generation of the Stokes shifted wavelengths shown in Table I, in response to an input pump beam at 532 nm, where to notation RSx denotes a rotational Stokes shifted wave of xth order, and VSx denotes a vibrational Stokes shifted wave of xth order.

TABLE I
STOKES SHIFTED WAVELENGTHS FOR $H_2$

| STOKES SHIFTED WAVE | WAVELENGTH (NANOMETERS) |
|---|---|
| RS1 | 549 |
| RS2 | 567 |
| RS3 | 587 |
| RS4 | 608 |
| RS5 | 630 |
| RS6 | 655 |
| VS1 | 683 |
| VS1 + RS1 | 712 |
| VS1 + RS2 | 743 |
| VS1 + RS3 | 776 |
| VS1 + RS4 | 813 |
| VS1 + RS5 | 854 |
| VS1 + RS6 | 899 |
| VS2 | 954 |
| VS2 + RS1 | 1010 |
| VS2 + RS2 | 1074 |
| VS2 + RS3 | 1146 |

The data illustrated in FIGS. 6 to 12 was generated with an Optical Multichannel Analyzer (not shown), obtained from EG&G Princeton Applied Research, Model No. OMA-III, consisting of a monochrometer to spectrally disperse the output Stokes shifted waves 26 after re-collimation by the lens 30, a linear detector to measure the relative intensities of the component wavelengths, and a computer/software system to analyze and display the results.

Figure 6:
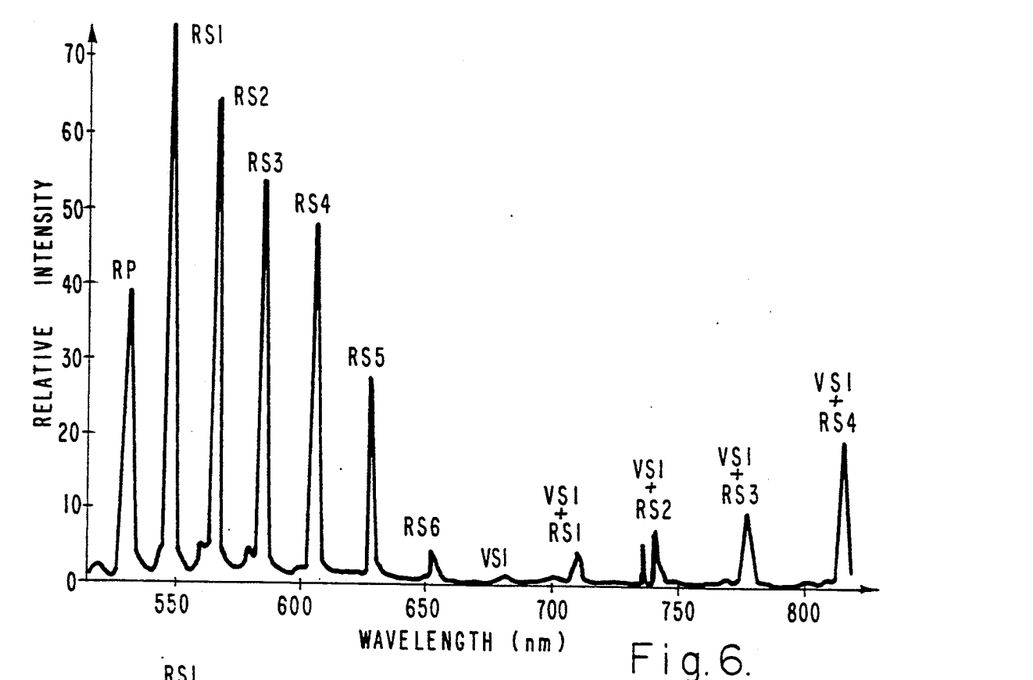
FIGS. 6 to 12 are graphs showing relative intensity at various wavelengths measured for various embodiments of the present invention.

FIG. 6 illustrates the embodiment where both polarizers 32 and 34 were switched to cause circular polarization. The residual pump beam at 532 nm is designated as RP. Although circular polarization caused the wavelength distribution to consist mainly of the shorter wavelength rotational Stokes shifted waves RS1 to RS6, smaller amplitude vibrational Stokes waves VS1 +RSx were also present. This is not unexpected, since the higher pressure in the Raman cell 24 promoted generation of vibrational rather than rotational Stokes shifted waves.

Figure 7:
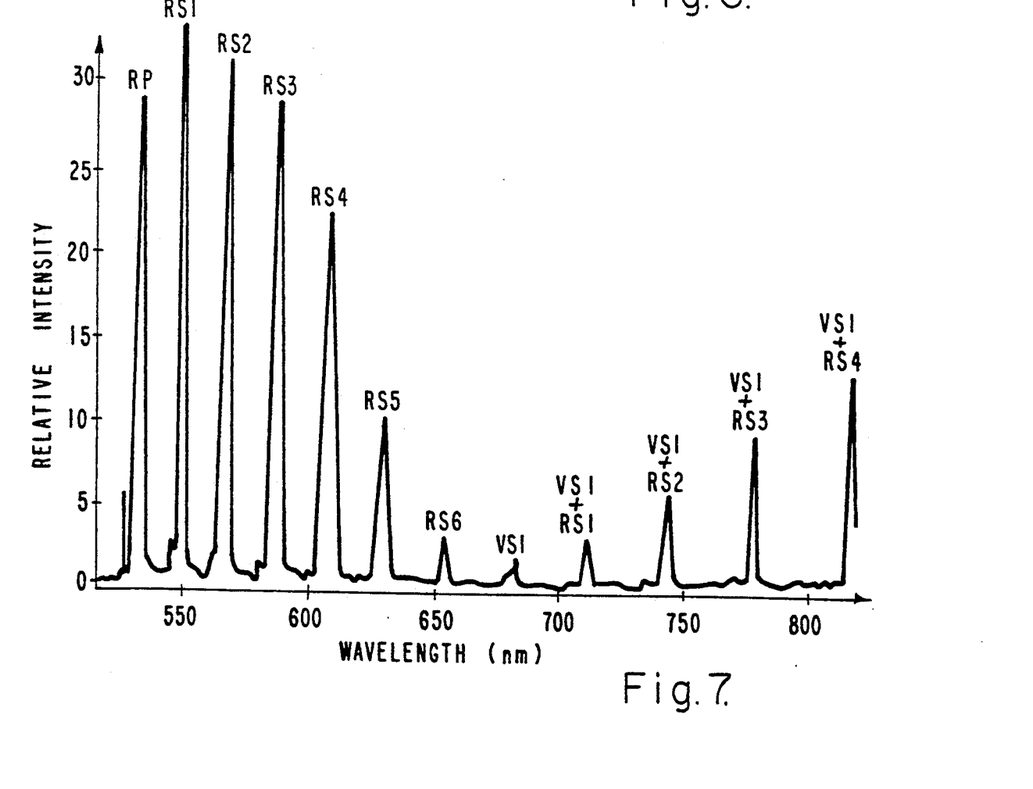

FIG. 7 illustrates the embodiment where the polarizer 32 was switched to circular polarization and the polarizer 34 was switched to linear polarization. It will be noted that in FIG. 7 the relative amplitudes of the rotational Stokes shifted waves are lower than in FIG. 6, whereas the relative amplitudes of the vibrational Stokes shifted waves are higher than in FIG. 6. In FIG. 7, the wavelengths of RSx are in the visible spectral region, whereas the wavelengths of VS1 and VS1+RSx are in the dark red to near infrared region, providing a wavelength range and diversity which were unobtainable in the prior art.

Figure 8:
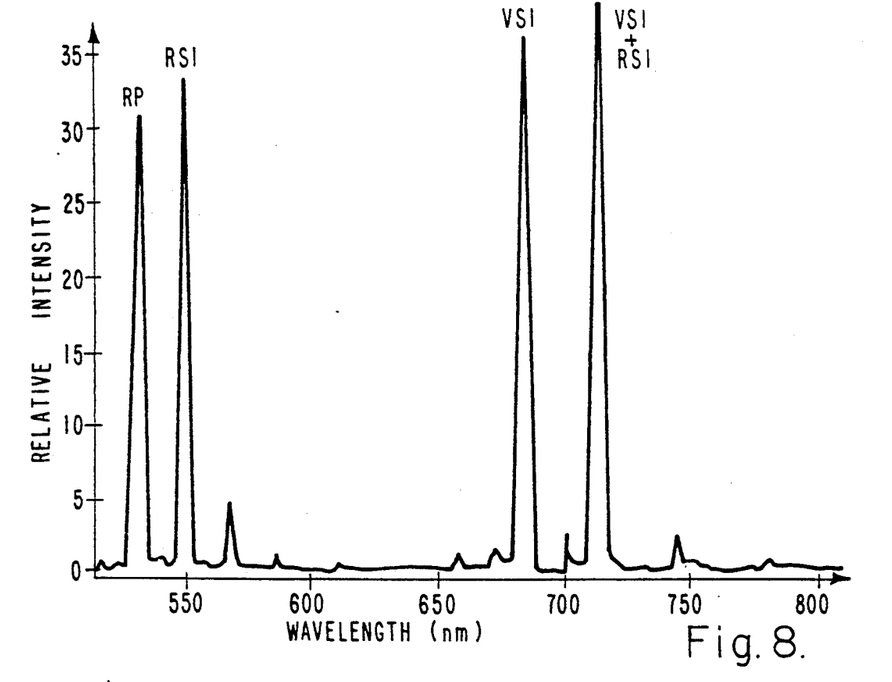

FIG. 8 illustrates the embodiment where the polarizer 32 was switched to linear polarization and the polarizer 34 was switched to circular polarization. The wavelength distribution is radically different from FIGS. 6 and 7. The output optical signal in FIG. 8 includes the residual input pump wave RP, first rotational Stokes shifted wave RS1, first vibrational Stokes shifted wave VS1, and the combination VS1+RS1, with all other wavelengths having minimal amplitude.

Figure 9:
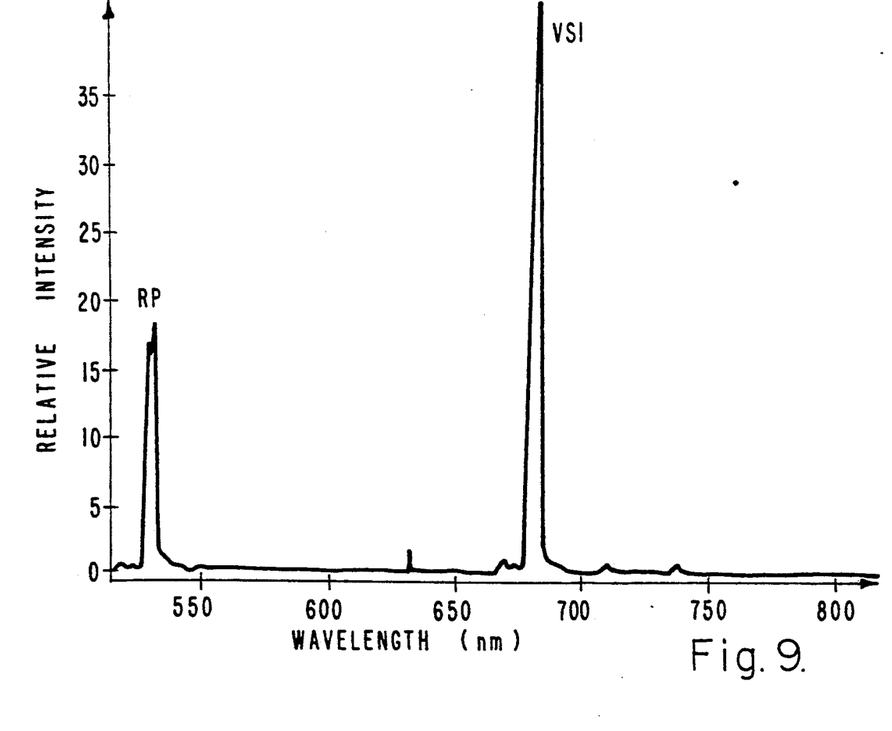
Figure 10:
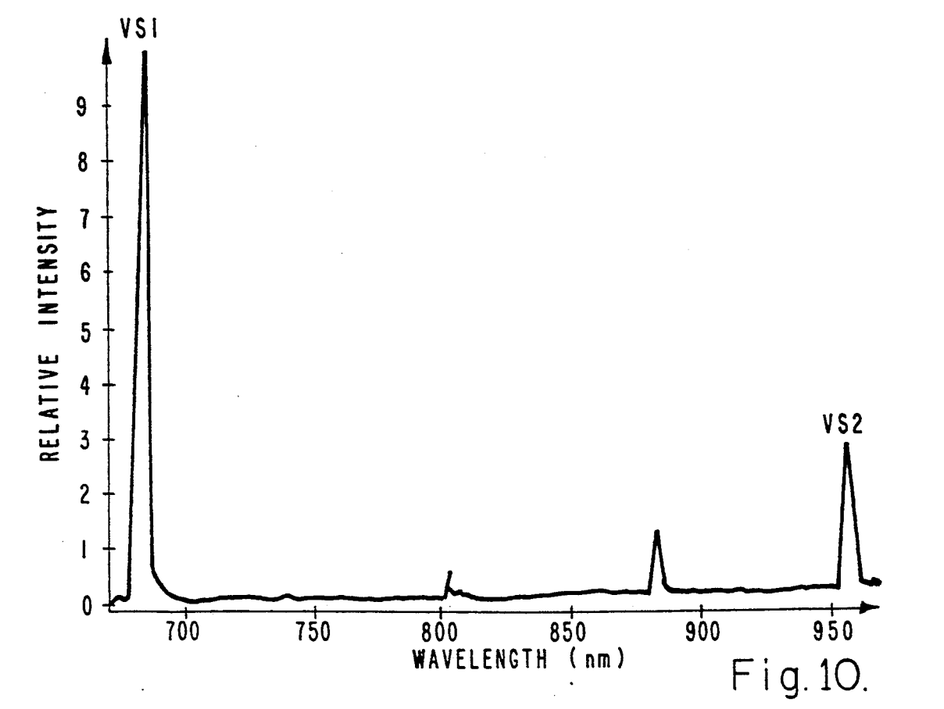

FIGS. 9 and 10 illustrate the embodiment where both polarizers 32 and 34 were switched to linear polarization, over different wavelength regions. The output optical signal shown in FIGS. 9 and 10 includes the residual pump wave RP, and the first and second vibrational waves VS1 and VS2 respectively. The origin of a spike which appears at approximately 880 nm in FIG. 9 is unknown.

Figure 11:
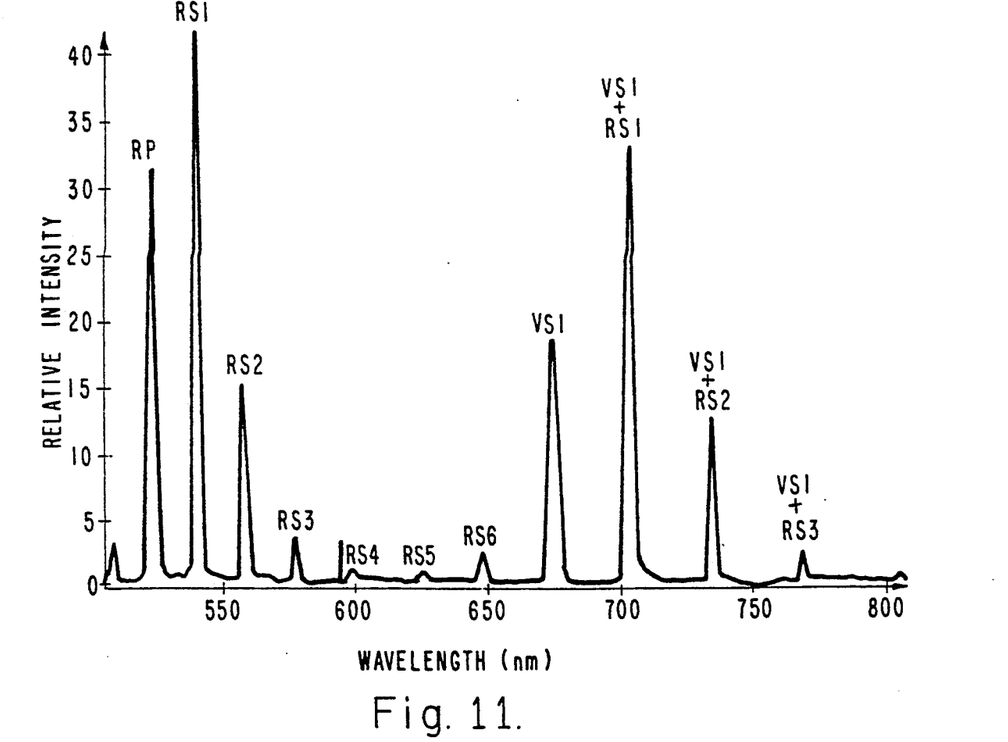

FIG. 11 illustrates the embodiment where the polarizer 32 was switched to elliptical polarization and the polarizer 34 was switched to linear polarization. The wavelength distribution shows a combination of rotational and vibrational Stokes shifted waves. This distribution includes a first anti-Stokes wave AS1. The elliptical/ linear polarization was found to produce a more desirable distribution than the circular/linear polarization (of FIG. 8).

The pressures (11 psig and 25 psig) of the $H_2$ gas in the Raman cells 12 and 24 respectively were determined through a combination of knowledge of the dependence of rotational and vibrational Raman gain on pressure, and through experimentation. For the pump conditions employed, at low pressures of less than approximately 25 psig, the rotational gain exceeds the vibrational gain, and at higher pressures the opposite is true.

If the pressure in the first cell exceeds 25 psig, some photons of the vibrational wavelengths are generated and amplified in the second cell even with circular input polarization. This effect would make it impossible to achieve a substantially pure rotational wavelength distribution. Conversely, if the pressure in the second cell were significantly below 25 psig, it would be difficult to achieve a substantially pure vibrational wavelength distribution. Thus, the pressure in the first cell is optimized for generation of rotational Stokes shifted waves, whereas the pressure in the second cell is set at the threshold where the generation of rotational and vibrational shifted waves are equally promoted.

Table II gives the measured wavelength distributions as percentages of the input beam intensity for the embodiments of FIGS. 6 through 11.

TABLE II
MEASURED WAVELENGTH DISTRIBUTIONS

| Wave | Cell Wavelength (nm) | | | | |
|---|---|---|---|---|---|
| Cell 12 | Circular | Circular | Linear | Linear | Elliptical |
| Cell 24 | Circular | Linear | Circular | Linear | Linear |
| AS1 | 0 | 0 | 0 | 0 | 1.8 |
| RP | 9.9 | 13 | 18.6 | 22.5 | 16.0 |
| RS1 | 19 | 17.3 | 19.8 | 0 | 21.4 |
| RS2 | 16.2 | 14.9 | 2.4 | 0 | 7.7 |
| RS3 | 13.7 | 13.4 | 0 | 0 | 2.0 |

TABLE II-continued
MEASURED WAVELENGTH DISTRIBUTIONS

| Wave Cell 12 Cell 24 | Cell Wavelength (nm) | | | | |
|---|---|---|---|---|---|
| | Circular Circular | Circular Linear | Linear Circular | Linear Linear | Elliptical Linear |
| RS4 | 12.1 | 10.6 | 0 | 0 | 0.5 |
| RS5 | 6.8 | 5.3 | 0 | 0 | 0.3 |
| RS6 | 1.3 | 1.4 | 0 | 0 | 1.5 |
| VS1 | 0.5 | 1.0 | 20.4 | 50 | 9.0 |
| VS1 + RS1 | 1.3 | 1.4 | 22.7 | 0 | 17.8 |
| VS1 + RS2 | 1.8 | 2.9 | 1.2 | 0 | 6.5 |
| VS1 + RS3 | 2.5 | 3.8 | 0 | 0 | 1.3 |
| VS1 + RS4 | 0 | 0 | 0 | 0 | 0 |
| VS2 | 0 | 0 | 0 | 12.5 | 0 |

Figure 12:
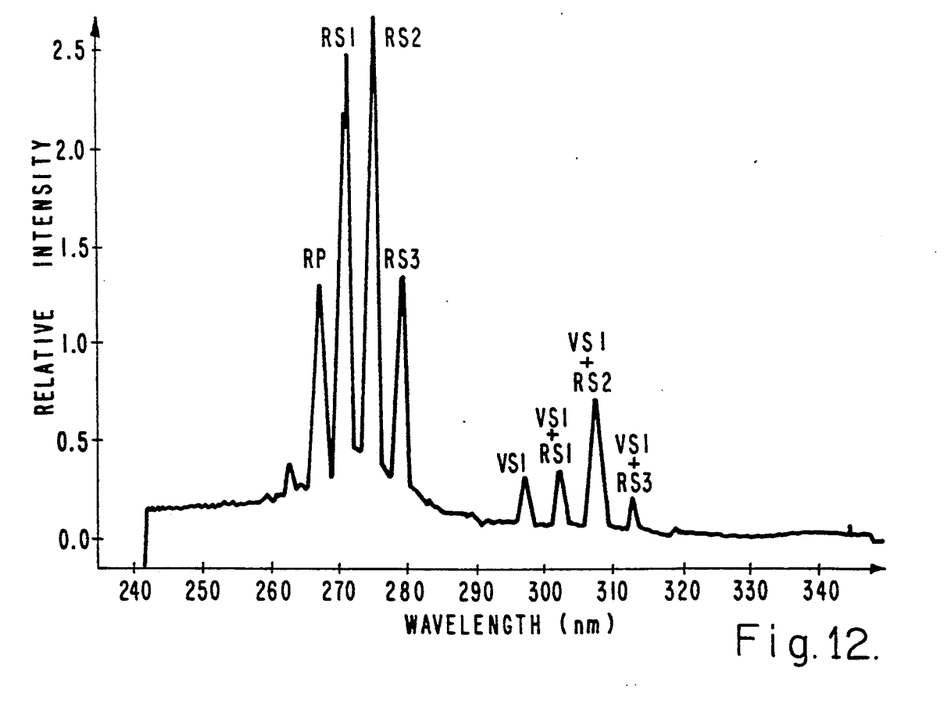

In each case shown in Table II, the total equals 85% of the pump input energy, since 15% of the energy is lost due to heating of the Raman medium, large angle scattering, etc. FIG. 12 illustrates the embodiment of the present invention where both polarizers were oriented for circular polarization. The pump beam for FIG. 12 was 266 nm, rather than the 532 nm used in the FIGS. 6–11. FIG. 12 corresponds to FIG. 6 except that a pump wavelength of 266 nm was used in the former. As can be seen from FIGS. 6–12, the present invention is effective at various pump wavelengths. While several illustrative embodiments of tho invention have been shown and described, numerous variations and alternate embodiments will occur to those skilled in the art, without departing from the scope of the invention. Accordingly, it is intended that the present invention not be limited solely to the specifically described illustrative embodiments. In particular, the present invention is not limited to a pump wavelength of 532 nm or 266 nm as specifically described, but may have any pump wavelength within the ultraviolet, visible, and near infrared regions. Further, the present invention is not limited to the gaseous Raman medium which was described in exemplary embodiments, but includes any known liquid or solid Raman medium which has a polarization-dependent Raman gain. Moreover, the present invention may be used with a pulsed laser input as well as with a continuous laser input. Various modifications are contemplated and can be made without departing from the scope of the invention as defined by the appended claims.

What is claimed is:

1. A Raman converter, comprising:
   Raman cell means for receiving an input optical signal and generating Stokes shifted waves in response thereto;
   polarization means disposed upstream of said Raman cell means for selectively causing the input optical signal to propagate therethrough to said Raman cell means with a first polarization state or a second polarization state which is different from the first polarization state; and
   control means for selectively switching said polarization means between the first and second polarization states at a predetermined time during receipt of said input optical signal by said Raman cell means to thereby generate a plurality of Stokes shifted waves having a time-varying wavelength distribution.

2. A Raman converter as in claim 1, in which said polarization means is constructed such that the first polarization state is circular polarization, causing said Raman cell means to generate said Stokes shifted waves as rotationally shifted Stokes waves; and the second polarization state is linear polarization, causing said Raman cell means to generate said Stokes shifted waves as vibrationally shifted Stokes waves.

3. A Raman converter as in claim 1, in which said polarization means is constructed such that at least one of the first and second polarization states is elliptical polarization.

4. A Raman converter as in claim 1, in which said control means is constructed to repeatedly switch said polarization means between the first and second polarization states.

5. A Raman converter as in claim 1, in which said polarization means comprises a wave plate which is mechanically rotatable by said control means between first and second positions to switch said polarization means between the first and second polarization states respectively.

6. A Raman converter as in claim 1, in which said polarization means comprises electro-optic cell means which is electrically switchable by said control means between first and second birefringent states to switch said polarization means between the first and second polarization states respectively.

7. A Raman converter as in claim 1, further comprising second Raman cell means disposed downstream of said Raman cell means for generating a second set of Stokes shifted waves in response to said Stokes shifted waves.

8. A Raman converter as in claim 7, further comprising:
   second polarization means disposed between said Raman cell means and the second Raman cell means for selectively causing said Stokes shifted waves to propagate therethrough with a third polarization state or a fourth polarization state which is different from the third polarization state; and
   second control means for selectively switching the second polarization means between the third and fourth polarization states at a predetermined time during receipt of said Stokes shifted waves by said second Raman cell.

9. A Raman converter as in claim 8, in which the second control means is constructed to repeatedly switch the second polarization means between the third and fourth polarization states.

10. A Raman converter as in claim 8, in which the second polarization means is constructed such that the third polarization state is circular polarization and the fourth polarization state is linear polarization.

11. A Raman converter as in claim 8, in which the second polarization means is constructed such that at least one of the third and fourth polarization states is elliptical polarization.

12. A Raman converter as in claim 7, in which:
   said Raman cell means comprises a first gaseous Raman medium at a pressure selected to maximize generation of rotational Stokes shifted waves;
   the second Raman cell means comprises a second gaseous Raman medium at a pressure selected to equally promote generation of rotational and vibrational Stokes shifted waves.

13. A Raman converter as in claim 1 wherein said Raman cell means comprises a Raman medium selected from the group consisting of a solid, a liquid, and a gas.

14. A Raman converter comprising:

first Raman cell means for receiving an input optical pump beam and generating a first set of Stokes shifted waves in response thereto;

second Raman cell means for generating a second set of Stokes shifted waves in response to said first set of Stokes shifted waves;

polarization means disposed between said first Raman cell means and said second Raman cell means for selectively causing said first set of Stokes shifted waves to propagate therethrough to the second Raman cell means with a first polarization state or a second polarization state which is different from the first polarization state; and control means for selectively switching said polarization means between the first and second polarization states at a predetermined time during receipt of said first set of Stokes shifted waves by said second Raman cell means to thereby generate a plurality of Stokes shifted waves having a time-varying wavelength distribution.

15. A Raman converter as in claim 14, further comprising:

second polarization means disposed upstream of said first Raman cell means for selectively causing the pump beam to propagate therethrough with a third polarization state or a fourth polarization state which is different from the third polarization state; and second control means for selectively switching the second polarization means between the third and fourth polarization states at a predetermined time during receipt of said pump beam by said first Raman cell.

16. A Raman converter as in claim 15, in which the second control means is constructed to repeatedly switch the second polarization means between the third and fourth polarization states.

17. A Raman converter as in claim 15, in which the second polarization means is constructed such that the third polarization state is circular polarization and the fourth polarization state is linear polarization.

18. A Raman converter as in claim 15, in which the second polarization means is constructed such that at least one of the third and fourth polarization states is elliptical polarization.

19. A Raman converter as in claim 14, in which:

said first Raman cell means comprises a first gaseous Raman medium at a pressure selected to maximize generation of rotational Stokes shifted waves; and said second Raman cell means comprises a second gaseous Raman medium at a pressure selected to equally promote generation of rotational and vibrational Stokes shifted waves.

20. A method of generating a plurality of Stokes shifted waves having a time-varying wavelength distribution, comprising the steps of:

(a) causing an input optical beam to propagate through Raman cell means to generate said Stokes shifted waves therein; and (b) repeatedly switching the polarization of the input optical beam between a first polarization state and a second polarization state at predetermined times during receipt of said input optical beam by said Raman cell means.

21. A method as in claim 20, further comprising the step of:

causing said Stokes shifted waves resulting after step (b) to propagate through second Raman cell means to generate a second set of Stokes shifted waves in response thereto.

22. A method as in claim 21, further comprising the step of:

repeatedly switching the polarization of said Stokes shifted waves between a third polarization state and a fourth polarization state at predetermined times during receipt of said Stokes shifted waves by said second Raman cell means.

23. A method as in claim 20, in which said switching in step (b) is performed at regular intervals.

24. A method as in claim 20, in which said switching in step (b) is performed at pseudo-random intervals.

25. A method of generating a plurality of Stokes shifted waves having a time-varying wavelength distribution, comprising the steps of:

(a) causing an input optical pump beam to propagate through a first Raman cell means to generate a first set of Stokes shifted waves therein;

(b) causing said first set of Stokes shifted waves to propagate through second Raman cell means to generate a second set of Stokes shifted waves in response thereto; and (c) repeatedly switching the polarization of polarization state and a second polarization state at a predetermined time during receipt of said first set of Stokes shifted waves by said second Raman cell.

26. A method as in claim 25, further comprising the step of:

repeatedly switching the polarization of said input optical pump beam between a third polarization state and a fourth polarization state at a predetermined time during receipt of said pump beam by said first Raman cell means.

* * * * *

UNITED STATES PATENT AND TRADEMARK OFFICE
CERTIFICATE OF CORRECTION

PATENT NO. : 5,099,147

DATED : March 24, 1992

INVENTOR(S) : EDUARD GREGOR, DAVID W. MORDAUNT and KATHERINE V. STRAHM

It is certified that error appears in the above-identified patent and that said Letters Patent is hereby corrected as shown below:

Col. 2, line 17, delete "15".

Col. 10, line 41, Claim 25, after "of" insert --said first set of Stokes shifted waves between a first--.

Signed and Sealed this

Twenty-second Day of March, 1994

*Attest:*

BRUCE LEHMAN

*Attesting Officer*      *Commissioner of Patents and Trademarks*